United States Patent [19]
Kunishige

[11] Patent Number: 5,323,222
[45] Date of Patent: Jun. 21, 1994

[54] DISTANCE-MEASURING DEVICE FOR USE WITH CAMERA

[75] Inventor: Keiji Kunishige, Tokyo, Japan

[73] Assignee: Olympus Optical Co., Ltd., Tokyo, Japan

[21] Appl. No.: 818,160

[22] Filed: Jan. 8, 1992

[30] Foreign Application Priority Data

Jan. 24, 1991 [JP] Japan .................... 3-022646

[51] Int. Cl.$^5$ .................... G01C 3/00; G01C 5/00; G03B 3/00
[52] U.S. Cl. .................... 356/1; 250/201.6; 354/403
[58] Field of Search .................... 356/1; 354/403; 250/201.6

[56] References Cited

U.S. PATENT DOCUMENTS

| | | |
|---|---|---|
| 3,679,307 | 7/1972 | Zoot et al. .................... 356/4 |
| 4,274,735 | 6/1981 | Tamura et al. .................... 356/1 |
| 4,464,038 | 8/1984 | Nanba . |
| 4,521,106 | 6/1985 | Lambeth .................... 356/1 |
| 4,687,914 | 8/1987 | Tsunekawa et al. .................... 354/403 |
| 4,764,786 | 8/1988 | Tamura et al. .................... 354/403 |
| 4,970,384 | 11/1990 | Kambe et al. .................... 356/1 |

FOREIGN PATENT DOCUMENTS

| | | |
|---|---|---|
| 62-300372 | 11/1987 | Japan .................... 356/4 |
| 1142410 | 6/1989 | Japan .................... 356/4 |

Primary Examiner—Stephen C. Buczinski
Attorney, Agent, or Firm—Frishauf, Holtz, Goodman & Woodward

[57] ABSTRACT

A distance measuring device contains a light-projecting section for projecting luminous flux onto a subject. A light-receiving section is placed the base length away from the light-projecting section, receives the reflected rays of light from the subject, and produces a photoelectric current according to the amount of light received. The light-receiving section is divided into at least four light-receiving elements by a first dividing line that crosses the base length at right angles and by a second dividing line that crosses the first dividing line obliquely. A first ratio calculating section calculates the ratio of the sum of the photoelectric currents generated by the light-receiving elements on one side of the first dividing line to the sum of the photoelectric currents produced by the light-receiving elements on the other side. A second ratio calculating section calculates the ratio of the sum of the photoelectric currents generated by the light-receiving elements on one side of the second dividing line to the sum of the photoelectric currents produced by the light-receiving elements on the other side. A distance-determining section calculates the sum of the outputs of the first and second ratio calculating sections, and based on the resulting value, determines the distance from the device to the subject.

24 Claims, 15 Drawing Sheets

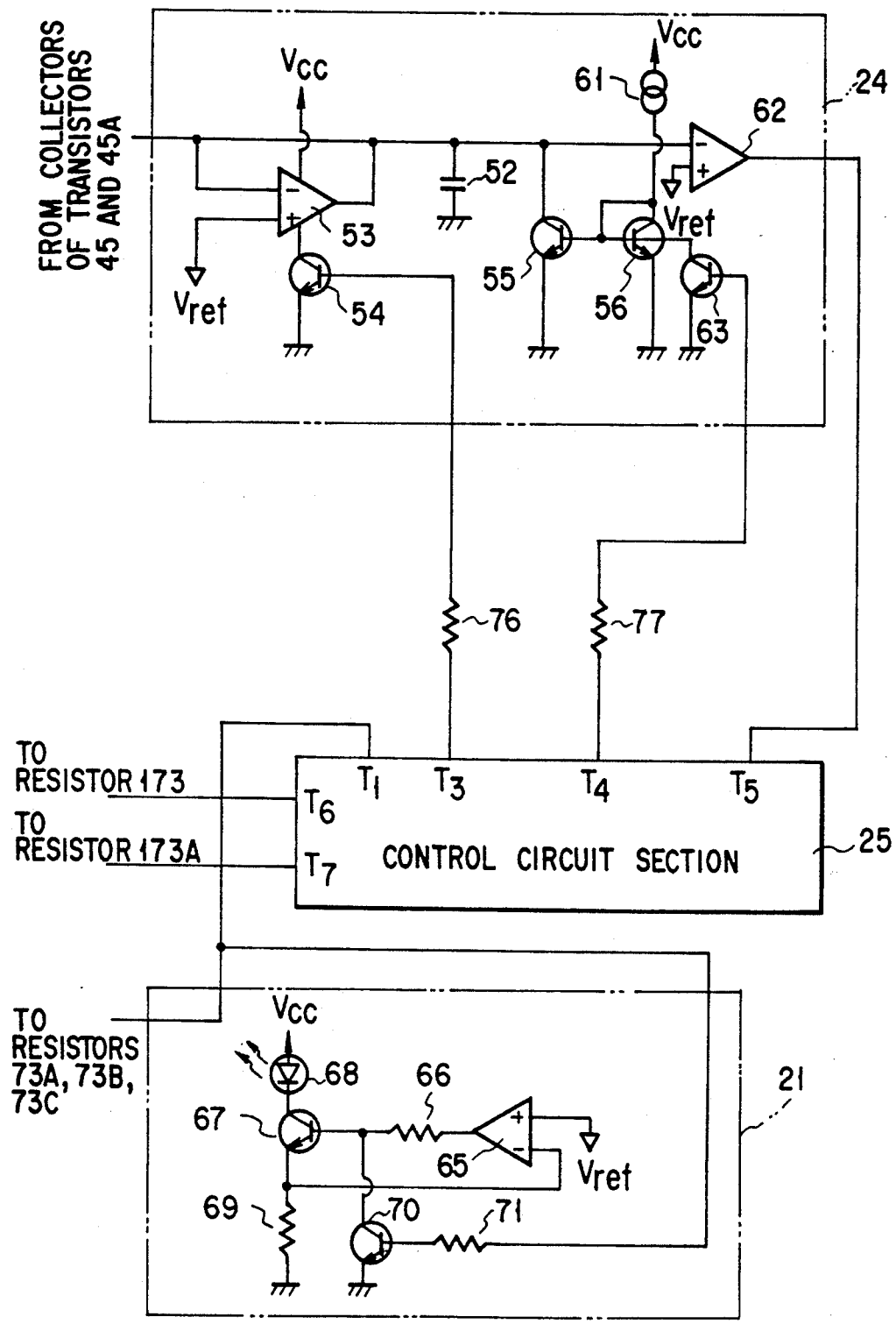
F I G. 5

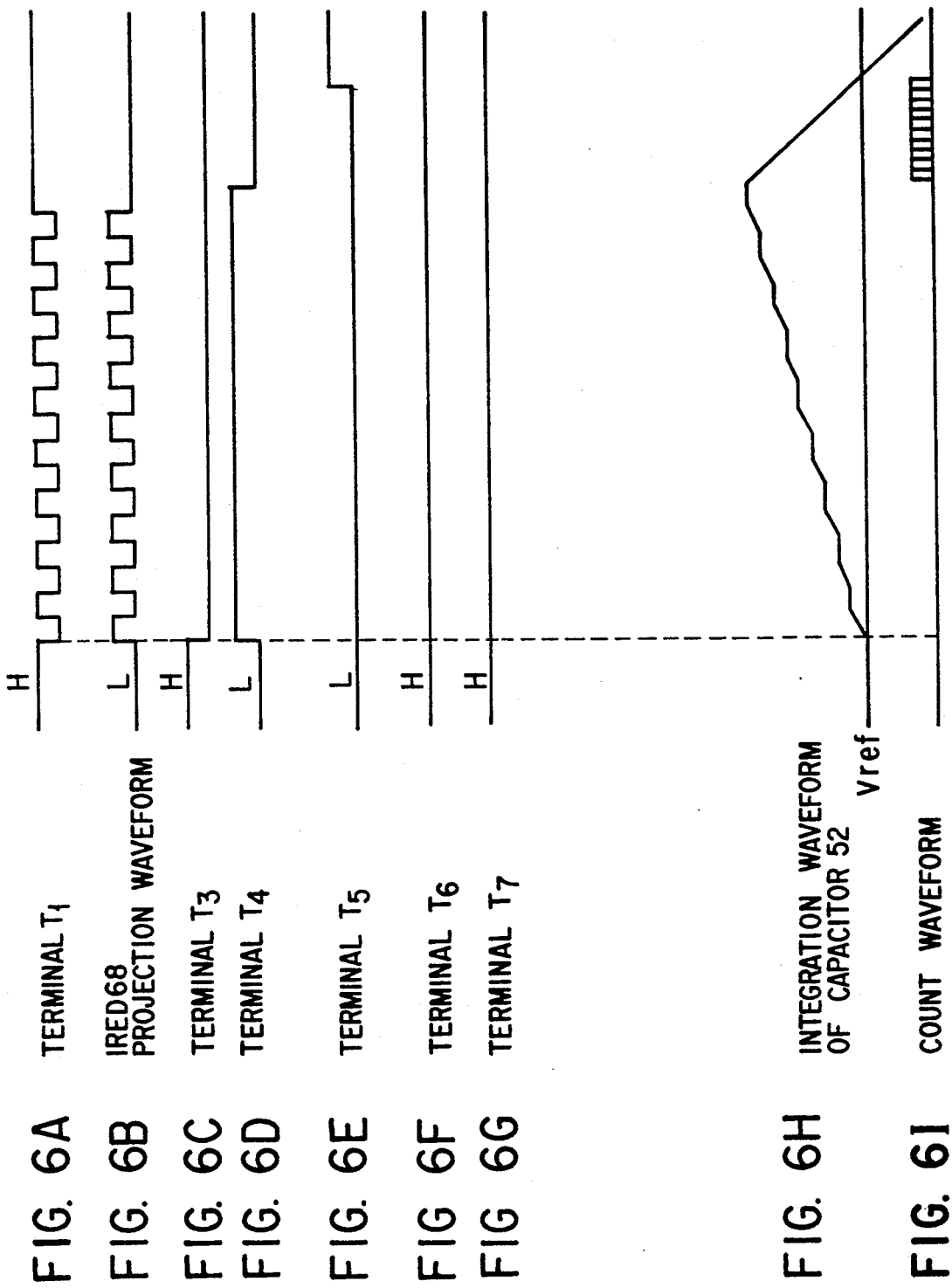

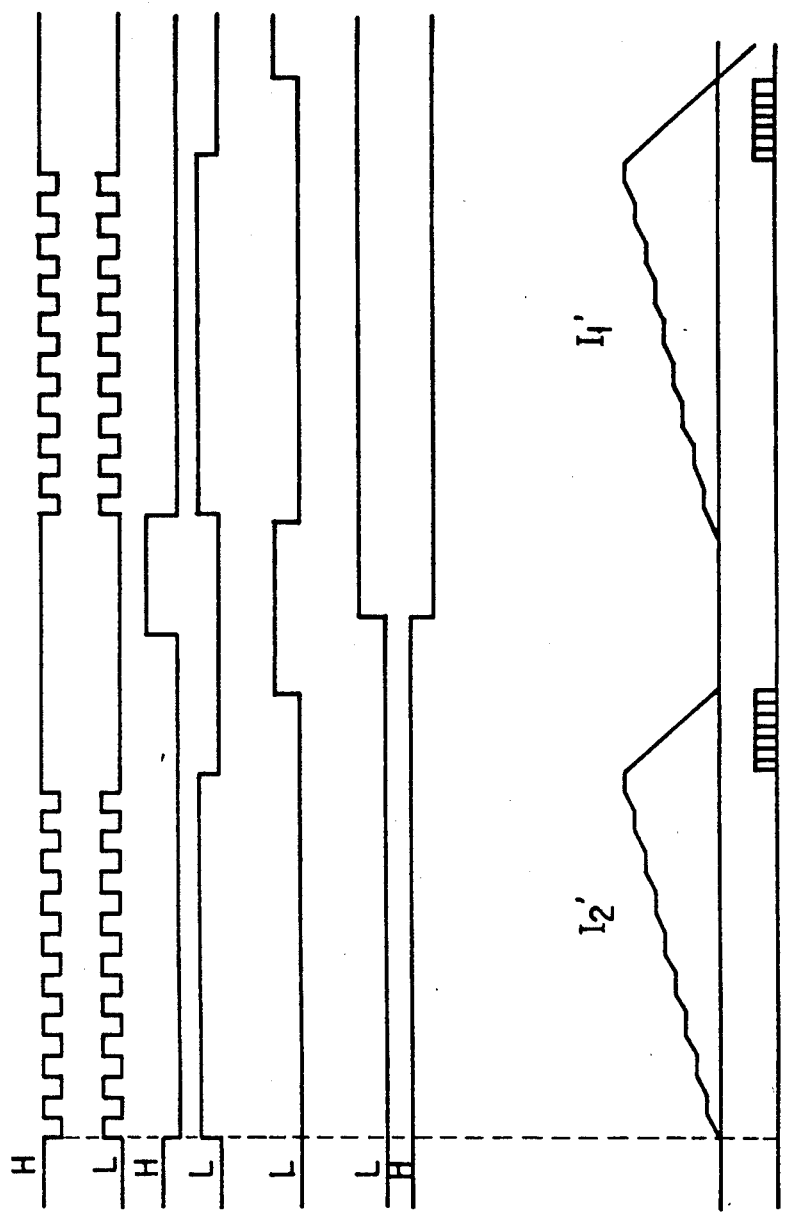

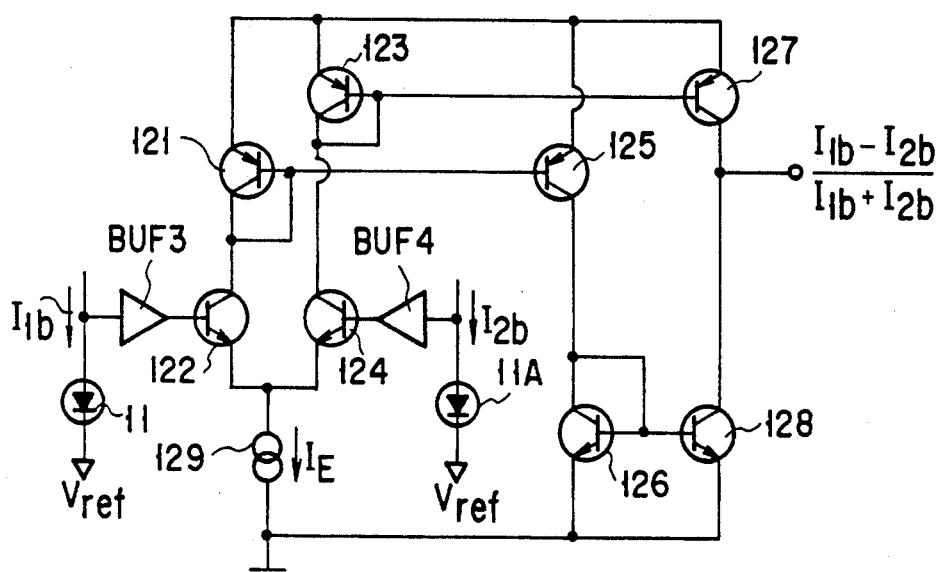
F I G. 10

DISTANCE-MEASURING DEVICE FOR USE WITH CAMERA

BACKGROUND OF THE INVENTION

1. Field of the Invention

This invention relates to a distance-measuring device for use with a camera or the like, and more particularly to a distance-measuring device based on light-projecting trigonometry, in which the distance from the device to an object is measured by projecting rays of light from the light-projecting section to the object and receiving the reflected rays of light with the light-receiving section located a specified base length away from the light-projecting section.

2. Description of the Related Art

Distance-measuring devices based on light-projecting trigonometry are well known and available with various types. For example, in the distance-measuring device disclosed in U.S. Pat. No. 4,464,038, as shown in FIG. 11A, a light projection pattern 85 is cast from a light-emitting element 80 via a projection lens 83 to an object. Then, the reflected rays of light from the object are directed by a reception lens 84 to light-receiving elements 81 and 82. Based on the outputs of the elements 81 and 82, the distance is determined. As shown in FIG. 11B, the light-emitting element 80 and light-receiving elements 81 and 82 are placed in specified positions on a single board 87. The light-emitting element 80 enclosed by an electrode section 80a is secured to one side of the board 87 and the two light-receiving elements 81 and 82 are fixed in close proximity to each other to the other side so that the boundary line between these elements 81 and 82 may be perpendicular to the direction of the base length 88.

In the distance-measuring device thus constructed, the position of the reflected-light image 89 formed on the extension of the base length 88 varies with the distance from the device to the object according to the principles of trigonometry. Because the difference in the light-receiving area between the light-receiving elements 81 and 82 varies with the position of the reflected-light image 89, the distance from the device to the object can be measured on the basis of the output difference between the light-receiving elements 81 and 82.

FIG. 12 illustrates the configuration of the optical system of the distance-measuring system shown in FIGS. 11A and 11B. Here, the light-emitting element 80 with the chip size t is located the focal length $f_T$ of the projection lens 83 away from this lens. The distance a from the device to the subject or the object 86 is determined based on the photoelectric current outputs $I_1$ and $I_2$ from the light-receiving elements 81 and 82 located the focal length $f_J$ of the light-receiving lens 84 away from this lens, which is the base length L away from the projection lens 83. FIGS. 13A through 13D show how the reflected-light image moves depending on the distance from device to object. When the reflected-light image 89 with an outside diameter of $t_J$ moves over the light-receiving elements 81 and 82 according to the distance from device to object, the distance calculation output $I_1/(I_1+I_2)$ based on the photoelectric current outputs $I_1$ and $I_2$ from the light-receiving elements 81 and 82 changes in the range of 1 to 0 depending on the distance from device to object, as shown in FIG. 13E. The range of 1 to 0 exactly corresponds to the outside diameter $t_J$ of the reflected-light image 89.

Such a conventional distance-measuring device, however, basically involves the conflicting requirements of improving the distance-measuring accuracy and expanding the distance-measuring range, which will be explained below.

In the aforementioned distance-measuring device, the reciprocal of the distance a from device to subject relates to the distance calculation output $I_1/(I_1+I_2)$ in such a manner as shown in FIG. 14A. Specifically, solid lines $I_1$ and $I_2$ in FIG. 14A show the relationship between the reciprocal of the distance a and the distance calculation output $I_1/(I_1+I_2)$ for light-projecting chip sizes $t_1$ and $t_2$ ($t_1<t_2$), respectively.

The amount of signal light reaching the light-receiving element from the subject is so small that the signal current ratio of $I_1/(I_1+I_2)$ is affected by circuit noise or the like. Variations in the output signal, or the range of noise, caused by circuit noise, as shown in FIG. 14B, have the same noise range $\Delta I_3$ and $\Delta I_4$ for the same distance $a_1$ in both cases of the characteristic curves $l_3$ and $l_4$. The distance calculation output $I_1/(I_1+I_2)$ to which the noise component is added is indicated by a shaded portion.

To determine the distance $a_1$ from device to subject, a reference level $V_a$ is used for the characteristic curve $l_3$ and $V_b$ for the characteristic curve $l_4$.

Because of the noise component, the range of uncertainty in determining the distance is $\alpha$ for the curve $l_3$ and $\beta$ for the curve $l_4$. That is, measuring the distance based on the curve $l_4$ results in a wider range of uncertainty in distance determination than based on the curve $l_3$, thus lowering the distance-measuring accuracy.

The distance-measuring accuracy of the device may be evaluated based on (range of noise)/(inclination of distance calculation output). Specifically, if the distance between the projection lens and light-emitting element is $f_T$, the base length L, and the chip size of the light-emitting element t, then the distance-measuring range S will be:

$$S = \infty \text{ through } f_T \cdot L/t.$$

If the distance calculation output noise is N, the distance-measuring accuracy R will be:

$$R = N \cdot f_T \cdot L/t$$

As seen from the these equations, the distance-measuring range S becomes greater as the focal length $f_T$ of the projection lens and the base length L become smaller. When the chip size t of the light-emitting element becomes as large as $t_2$, as shown by the characteristic curve $l_2$ in FIG. 14A, its expansion to $f_T \cdot L/t_2$ on the nearest side broadens the distance-measuring range S, but the distance-measuring accuracy R gets worse. In contrast, as $f_T$ and L become larger or t gets smaller, the distance-measuring accuracy R gets better but the measuring range S becomes smaller. In other words, in such a distance-measuring device, improvements in the measuring accuracy run counter to the expansion of measuring range.

To cause improvements in the measurement accuracy to be compatible with the expansion of measuring range, it may be possible to increase the amount of light to be projected to decrease the noise range of the distance calculation output. For use with compact devices such as cameras, space for the power supply and the projection and reception sections should be as small as possible and the power supplied to the distance-measuring device be minimized. Therefore, the way to increase the amount of light to be projected cannot be accepted from viewpoints of cost and space.

The way to increase the chip size t of the light-projecting element or shorten the focal length $f_T$ of the projection lens to expand the measuring range creates a larger projection pattern than the object because the object is normally a thing of a limited size such as a person, which makes it difficult to measure the distance accurately.

To broaden the measuring range, there may be a method of tilting the boundary lines toward the direction of the base length as shown in FIGS. 15A through 15D (FIG. 15E is a finally obtained characteristic diagram). This method also has similar characteristic curves to those in FIG. 14B, meaning a deteriorated measuring accuracy.

SUMMARY OF THE INVENTION

Accordingly, the object of the present invention is to provide a distance-measuring device capable of improving the distance-measuring accuracy, while expanding the distance-measuring range.

The foregoing object is accomplished by providing a distance-measuring device comprising: light-projecting means for projecting luminous flux to a subject; light-receiving means located the base length away from the light-projecting means, which receives the reflected rays of light from the subject and generates a photoelectric current in proportion to the amount of light received, and which is divided into at least four light-receiving sections by a first dividing line that crosses the base length at right angles and by a second dividing line that crosses the first dividing line; first ratio calculating means for calculating the ratio of the sum of the photoelectric currents generated by the light-receiving sections on one side of the first dividing line to the sum of the photoelectric currents generated by the light-receiving sections on the other side; second ratio calculating means for calculating the ratio of the sum of the photoelectric currents generated by the light-receiving sections on one side of the second dividing line to the sum of the photoelectric currents generated by the light-receiving sections on the other side; and distance-determining means for calculating the sum of the outputs of the first and second ratio calculating means and, based on the resulting value, determining the distance from the device to the subject.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a circuit diagram for still another portion of the distance-measuring device;

FIGS. 6A through 6I are timing charts of the signals for the control circuit diagram of FIG. 5;

FIGS. 7A through 7I are timing charts for forming a distance-measuring characteristic diagram with respect to time;

FIG. 10 is a circuit diagram for another embodiment of the calculation output circuit section of FIG. 4;

DETAILED DESCRIPTION OF THE PREFERRED EMBODIMENTS

Referring to the accompanying drawings, the present invention will be explained concretely.

Figure 1:
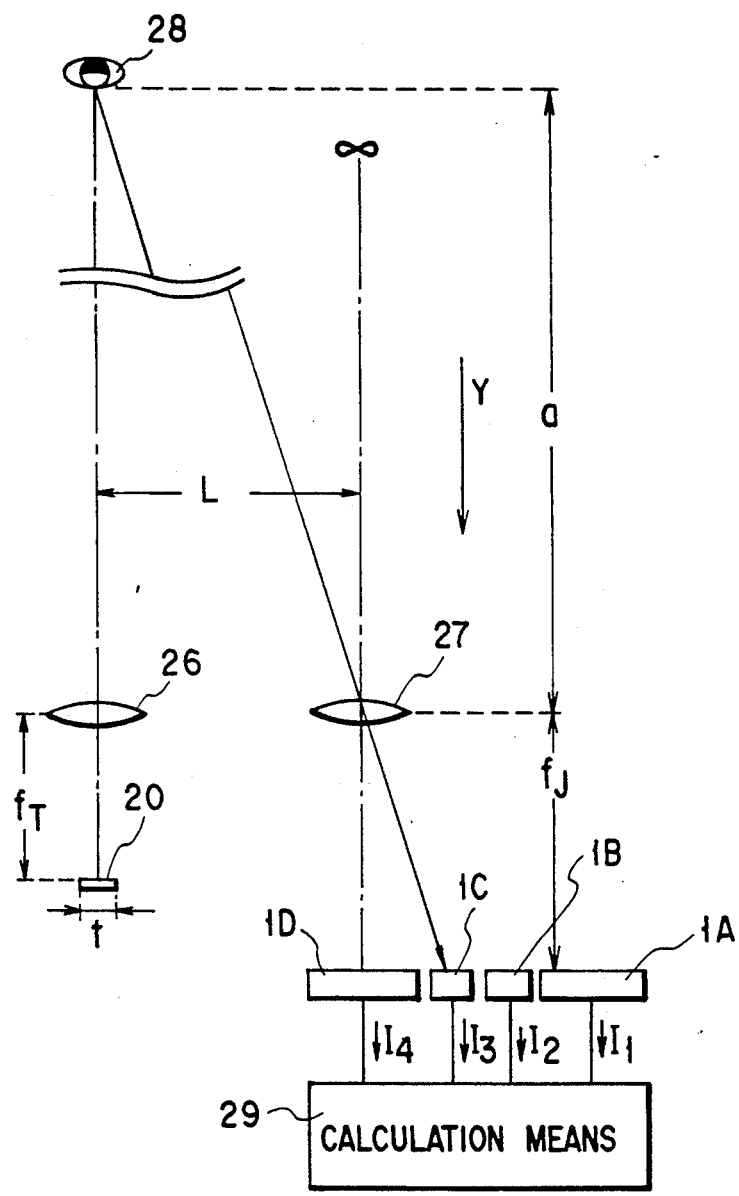
FIG. 1 is an arrangement diagram for the optical system of a distance-measuring device according to an embodiment of the present invention.

FIG. 1 is a view showing the arrangement of the optical system of a distance-measuring device according to an embodiment of the present invention. Here, for light-receiving elements, four SPD (silicon photodiodes) 1A, 1B, 1C, and 1D are provided.

Figure 2A:
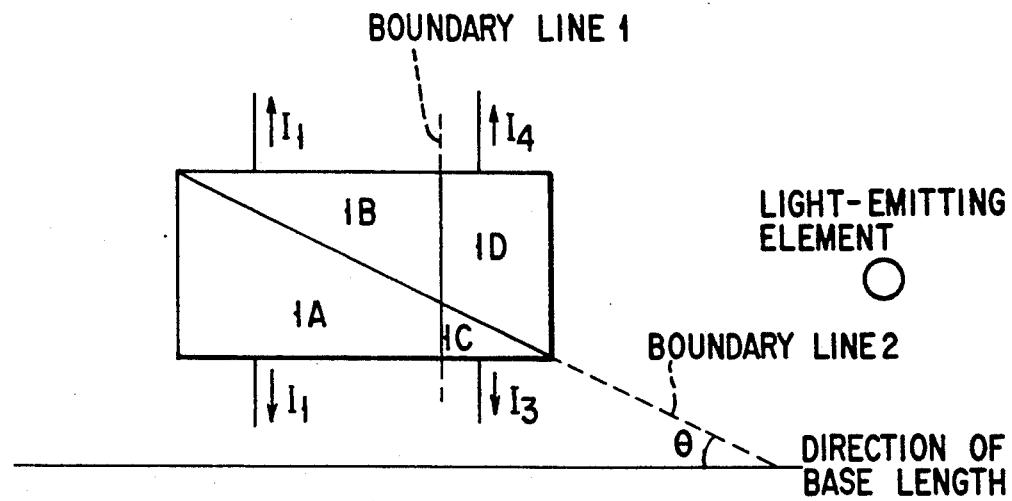
FIG. 2A is a view showing the shape of the light-receiving element when seen from the direction of arrow Y in FIG. 1, and FIGS. 2B through 2D are views showing the shapes of other elements, respectively.

FIG. 2A is a view showing the shape of the light-receiving element when seen from in the direction of arrow Y. In the present invention, to solve the aforementioned problem, distance-measuring accuracy is given importance in the long-distance range and the expansion of distance-measuring range is stressed in the short-distance range. To achieve this, as shown in FIG. 2A, the light-receiving element is divided by boundary lines 1 and 2 as follows: boundary line 1 divides the element into a set of SPD 1A and 1B and a set of SPD 1C and 1D, and boundary line 2 splits the element into a set of SPD 1A and 1C and a set of SPD 1B and 1D. Each division is made so that each boundary line and the direction of base length are placed at different angles. In this embodiment, a combination of the SPD 1A-1C set and the SPD 1B-1D set is used for the short-distance range, whereas a combination of the SPD 1A-1B set and the SPD 1C-1D set is used for the long-distance range.

In FIG. 1, a light-emitting element 20 of the chip size t is located the focal length $f_T$ of a projection lens 26 away from this lens. The luminous flux from the element 20 is condensed by the projection lens 26 and then projected onto the object 28. The rays of light reflected by the object 28 are gathered by a reception lens 27 located the basic length L away from the projection lens 26. This gathered light then reaches the SPD 1A, 1B, 1C, and 1D placed the focal length $f_J$ of the lens 27 away from this lens. With the light incident upon them, the SPD IA, 1B, 1C, and 1D generate photoelectric currents $I_1$, $I_2$, $I_3$, and $I_4$, respectively, which are in turn supplied to a calculation means 29 for determining the distance.

Figure 3:
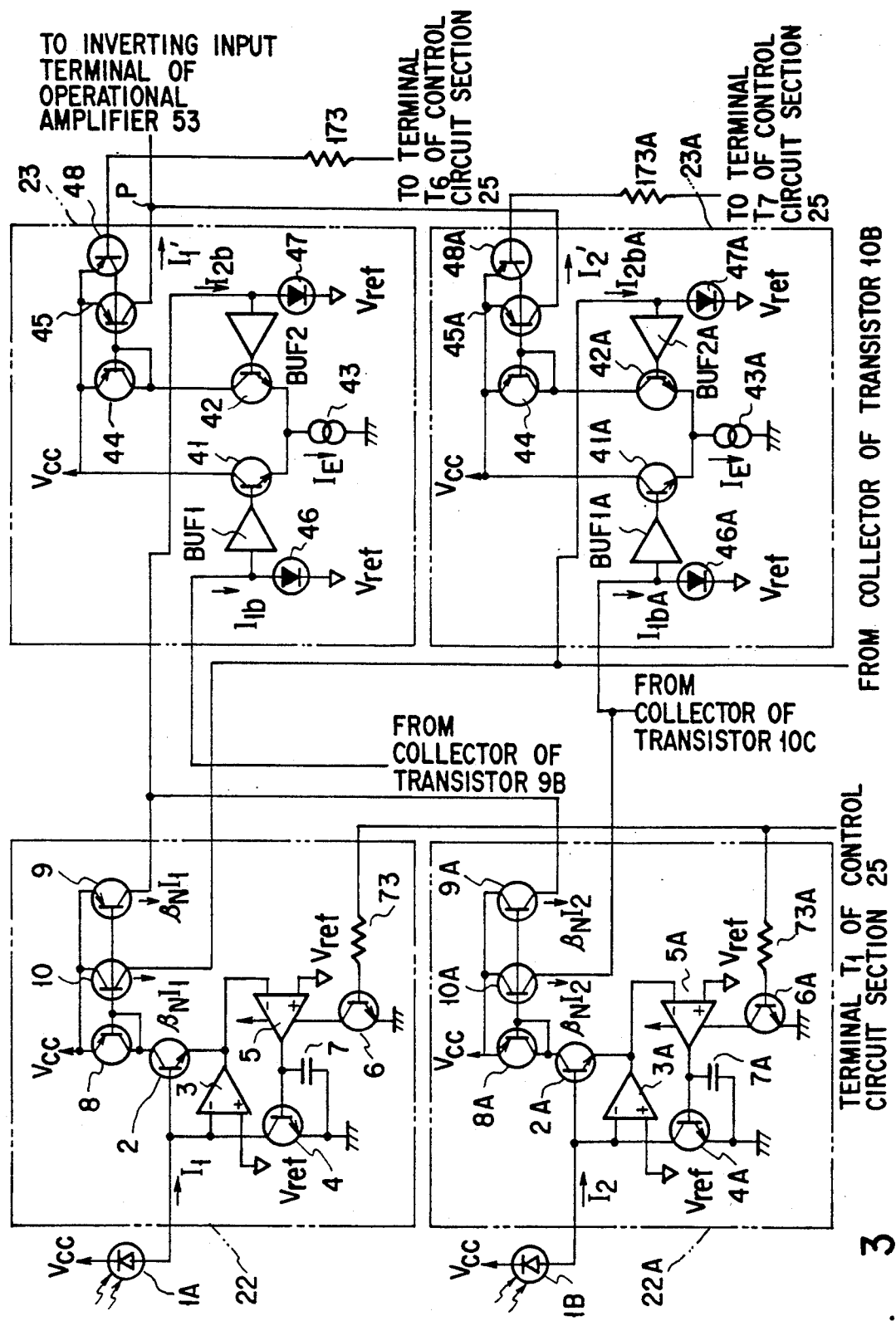
FIG. 3 is a circuit diagram for a portion of a distance-measuring device according to the present invention.
Figure 4:
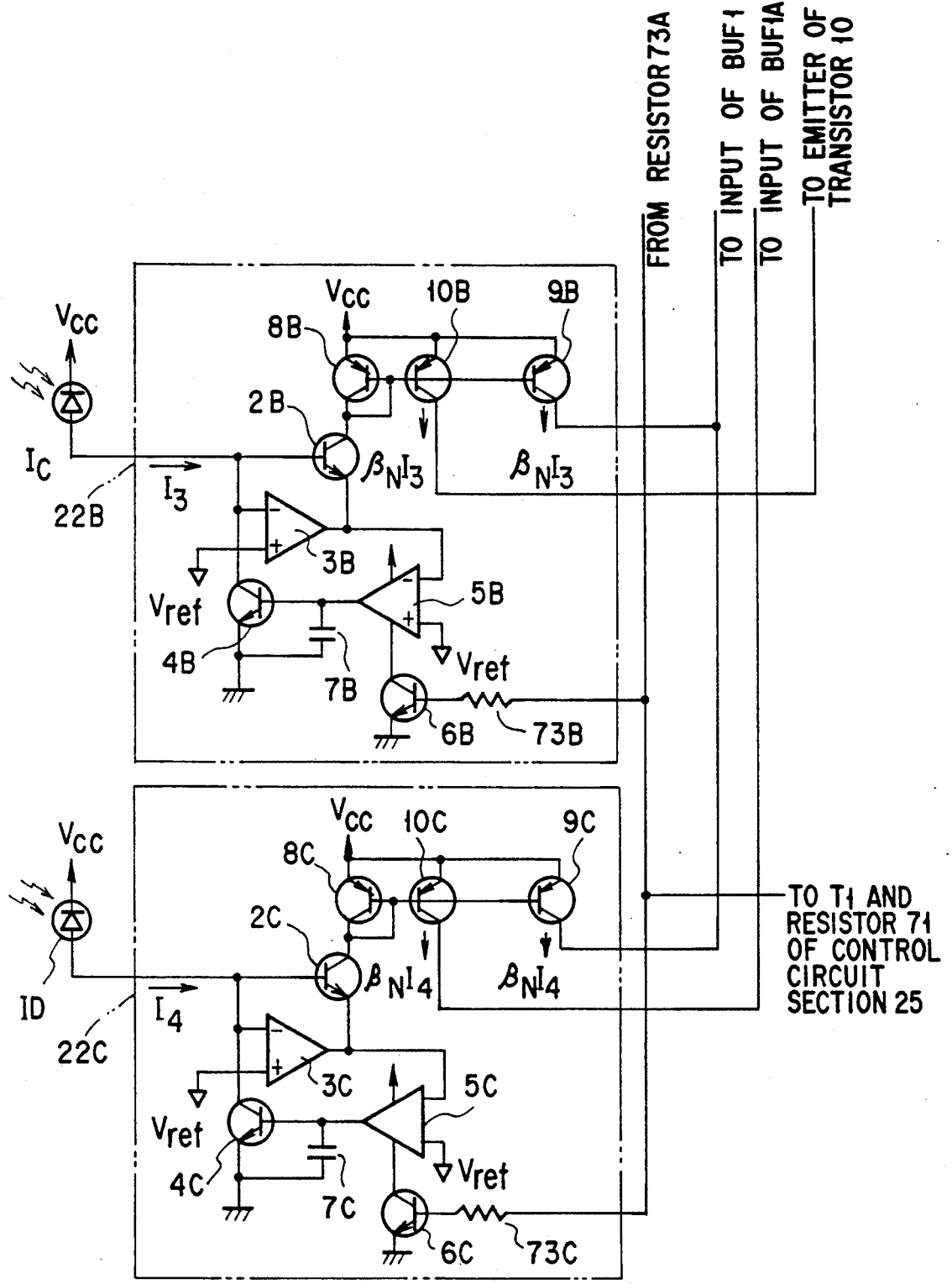
FIG. 4 is a circuit diagram for another portion of the distance-measuring device.

FIGS. 3 through 5 are circuit diagrams for a distance-measuring device according to the present embodiment. FIG. 6 is a timing chart of the signals supplied from the control circuit section 25 of FIG. 5.

The distance-measuring device is comprised of: a light-projecting circuit 21 that projects optical pulses onto the object as shown in the figure; photoelectric current sensing circuit sections 22, 22A, 22B, and 22C that receive the reflected rays of light from the object and sense and amplify the signal pulse photoelectric current component; calculation output circuit sections 23 and 23A that obtain distance information based on the photoelectric current superimposed on the bias current; a count circuit section 24 that performs an analog-to-digital conversion of the outputs from the calculation output circuit sections 23 and 23A; and a control circuit section 25 that supplies control signals to the above individual sections.

Because the photoelectric current sensing circuit sections 22, 22A, 22B, and 22C each use the same parts and are constructed the same way, only the circuit section 22 will be explained, with the same parts in the circuits 22A, 22B, and 22C assigned A, B, or C after corresponding reference characters, to avoid repetitive explanation. This holds true for the calculation output circuit sections 23 and 23A.

In FIG. 5, the IRED (infrared light-emitting diode) 68 of the light-projecting circuit section 21 is driven by a constant-current driving circuit, which is comprised of a transistor 67, resistors 66 and 69, and an operational amplifier 65. The base of a transistor 70 for on/off control of the constant-current driving circuit is connected to the terminal $T_1$ of the control circuit section 25 via the resistor 71. On and off control of infrared rays of light, which are projected from the IRED 68 in pulse waveform as shown in FIG. 6, is performed by the output signal (see FIG. 6) from the terminal $T_1$ of the control circuit section 25.

The photoelectric current sensing circuit section 22 of FIG. 3 is made up of: a preamplifier circuit section including an operational amplifier 3 and a transistor 2; a background light removing circuit section including an operational amplifier 5, a transistor 4, and its peripheral circuit; and a current mirror circuit including transistors 8, 9, and 10.

The signal pulse photoelectric current $I_1$ from the anode of the SPD 1A is supplied to the operational amplifier 3 of the preamplifier circuit section. The operational amplifier 3 has its output terminal connected to the emitter of the transistor 2, its inverting input terminal to the base, and the noninverting input terminal to the reference power supply $V_{ref}$ for feedback by the transistor 2, so that the base input resistance of the transistor 2 is equivalently decreased to several tens kΩ.

The operational amplifier 5 of the background light removing circuit section goes to the active state when the high-level output signal from the terminal $T_1$ of the control circuit section 25 is supplied via the resistor 73 to the base of the transistor 6 during no light projection. It then accumulates as much charge as proportional to the brightness of the background light in a capacitor 7 connected to its output terminal. At the same time, it also permits the photoelectric current component of the SPD 1A created by the background light and the bias current component of the operational amplifier 3 to be discharged in the form of collector current of transistor 4 to the ground line through the feedback loop made up of the capacitor 7 and transistor 4. As a result, the collector current of the transistor 2 presents a value almost proportional to the pulse signal photoelectric current irrespective of the background light. During light projection, the transistor 6 turns off and the operational amplifier 5 goes to the inactive state. Because the charges accumulated in the capacitor 7 allow the transistor 4 to discharge the background light-caused photoelectric current to the ground line, the pulse light component equal to the photoelectric current from the SPD 1A anode minus the background light-caused photoelectric current is multiplied by $\beta_N$, returned by the current mirror circuit 8, 9, 10, and injected into a compression diode 47 of the calculation circuit section 23 as the signal pulse photoelectric current $\beta_N I_1$.

The photoelectric currents $I_2$, $I_3$, and $I_4$ from the anodes of the remaining SPD 1B, 1C, and 1D of FIG. 3 are processed at the photoelectric current sensing circuit sections 22A, 22B, and 22C, respectively, which all operate the same way as the circuit section 22, and then are supplied to the calculation output circuit sections 23 and 23A as the signal pulse photoelectric currents $\beta_N I_2$, $\beta_N I_3$, and $\beta_N I_4$.

The calculation output circuit section 23 of FIG. 3, which is made up of transistors 41, 42, 44, 45, and 48, compression diodes 46 and 47, a constant current source 43, and buffer circuits $BUF_1$ and $BUF_2$, constitutes a logarithmic expansion circuit to produce a distance calculation output. The base of the transistor 48 is connected to the terminal $T_6$ of the control circuit section 25 via the resistor 173.

The bases of the transistors 41 and 42 constituting a differential amplifier are connected via buffer circuits $BUF_1$ and $BUF_2$ to the anodes of the compression diodes 46 and 47, respectively. Their emitters are connected in common to the constant current source 43. The collector of the transistor 42 is connected to both bases of the transistors 44 and 45 constituting the current mirror circuit and the collector of the transistor 44.

Circuit connection is made so that the currents $I_{1b}$ and $I_{2b}$ flowing through the diodes 46 and 47, respectively, may be combined with the signal pulse photoelectric current from the photoelectric current sensing circuit section 22 to form a total current. Thus, in the calculation output circuit section 23, the current $I_{2b}$ equals the sum of the signal pulse photoelectric currents $\beta_N I_1$ and $\beta_N I_2$ from the photoelectric current sensing circuits 22 and 22A, and the current $I_{1b}$ equals the sum of the signal pulse photoelectric currents $\beta_N I_3$ and $\beta_N I_4$ from the photoelectric current sensing circuit sections 22B and 22C. These are expressed as:

$$I_{2b} = \beta_N (I_1 + I_2) \ldots \quad (1)$$

$$I_{1b} = \beta_N (I_3 + I_4) \ldots \quad (1)'$$

If the constant current of the constant current source 43 is $I_E$, the collector current $I_C$ of the transistor 42 will be expressed as:

$$I_C = I_{2b} \cdot I_E / (I_{1b} + I_{2b}) \ldots \quad (2)$$

Substituting equations (1) and (1)' into equation (2), the collector current $I_1'$ of the transistor 45 or the output of the calculation output circuit section 23 will be expressed as:

$$I_1' = (I_1 + I_2) \cdot I_E / (I_1 + I_2 + I_3 + I_4) \ldots \quad (3)$$

Similarly, in the calculation output circuit section 23A, the current $I_{2bA}$ equals the sum of the signal pulse photoelectric currents $\beta_N I_1$ and $\beta_N I_3$ from the photoelectric current sensing circuits 22 and 22B, and the current $I_{1bA}$ equals the sum of the signal pulse photoelectric currents $\beta_N I_2$ and $\beta_N I_4$ from the photoelectric current sensing circuit sections 22A and 22C. These are expressed as:

$$I_{2bA} = \beta_N (I_1 + I_3) \ldots \quad (4)$$

$$I_{1bA} = \beta_N (I_2 + I_4) \ldots \quad (4)'$$

Substituting equations (4) and (4)' into equation (2), the output current $I_2'$ from the second calculation circuit section 23A will be expressed as:

$$I_2' = (I_1 + I_3) \cdot I_E / (I_1 + I_2 + I_3 + I_4) \ldots \quad (5)$$

Figure 8A:
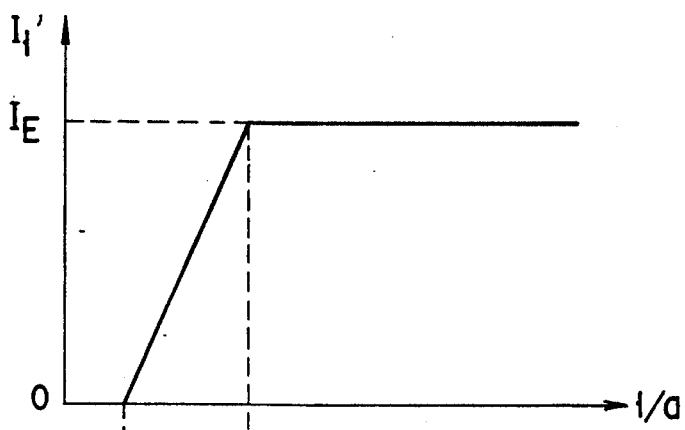
FIGS. 8A and 8B are characteristic diagrams showing the relationship between the signal pulse photoelectric current output from the calculation output circuit section with respect to the distance from device to subject.
Figure 8B:
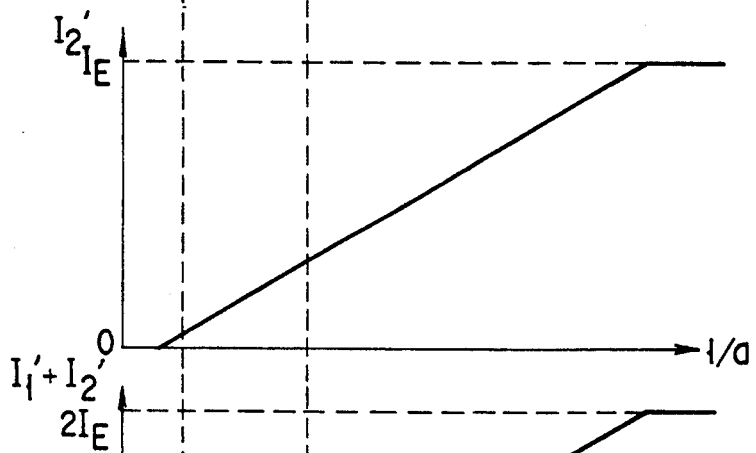
Figure 8C:
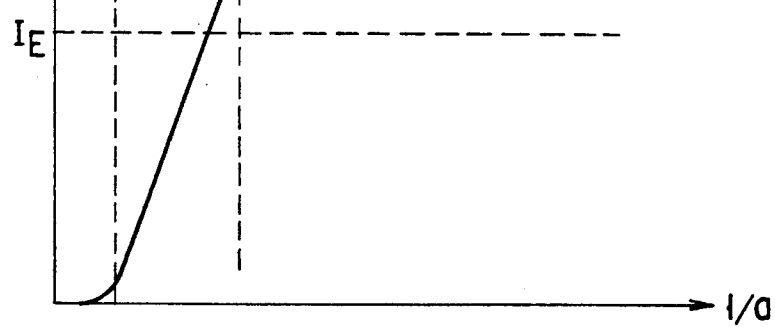
FIG. 8C is a diagram obtained by combining FIG. 8A and FIG. 8B curves into one.
Figure 9A:
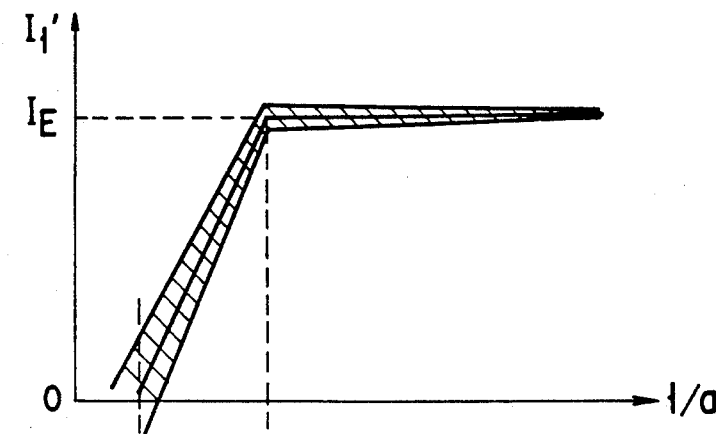
FIGS. 9A, 9B, and 9C are characteristic diagrams obtained by superimposing noise on the diagrams in FIG. 8A, 8B, and 8C, respectively.
Figure 9B:
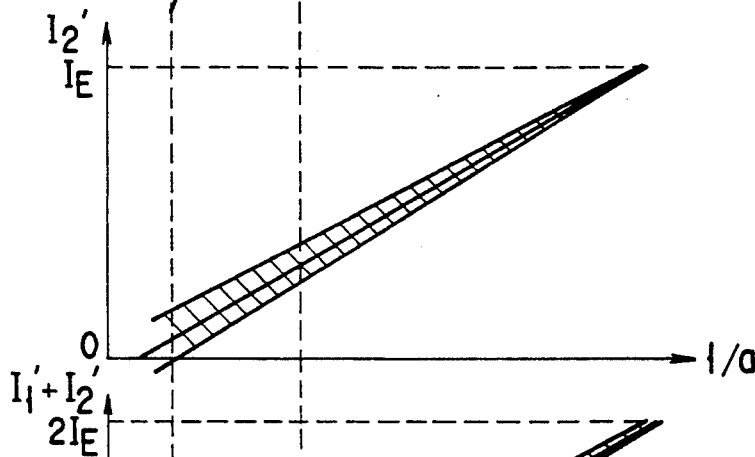
Figure 9C:
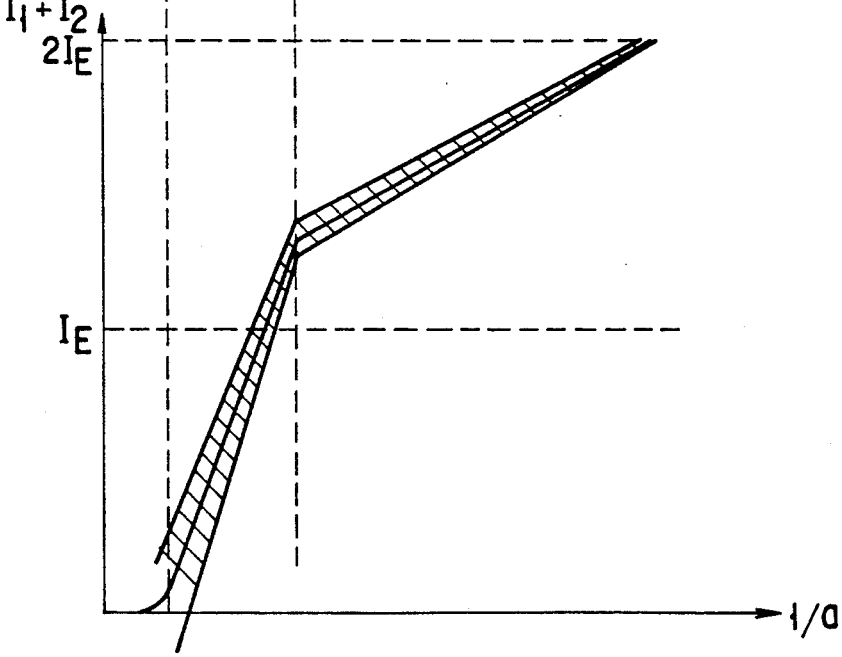
Figure 11A:
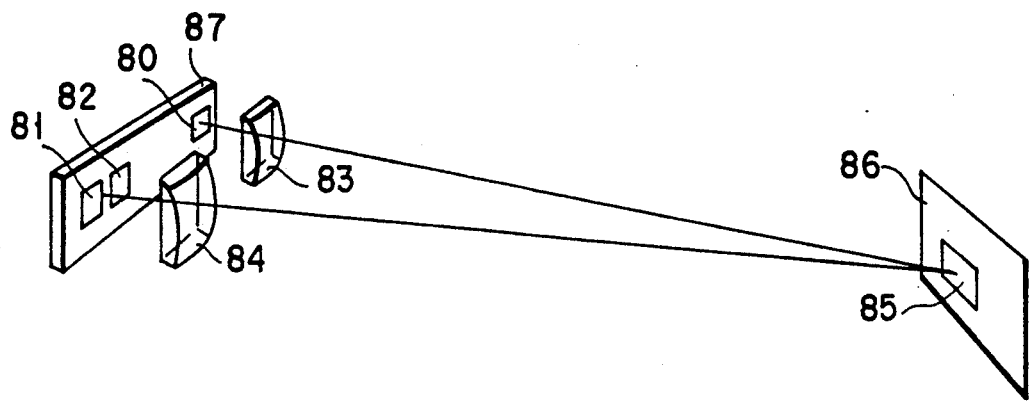
FIGS. 11A and 11B are a perspective view and front view, respectively, showing the arrangement of the optical system of a conventional distance-measuring device.
Figure 11B:
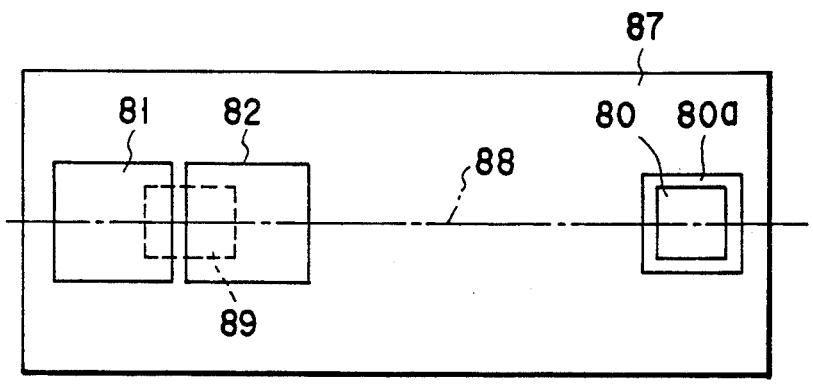
Figure 12:
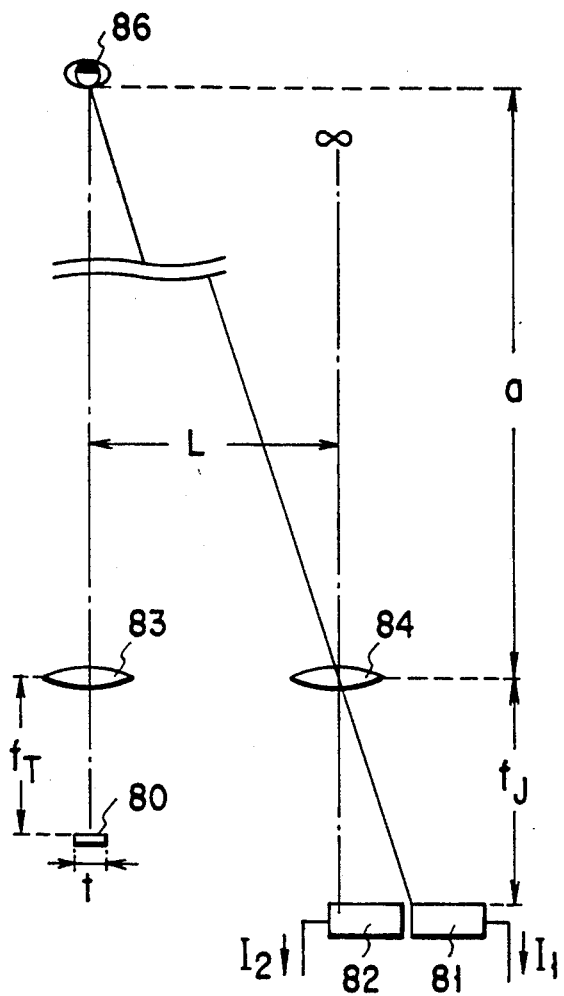
FIG. 12 is a plan view illustrating the arrangement of the conventional distance-measuring device.
Figure 13A:
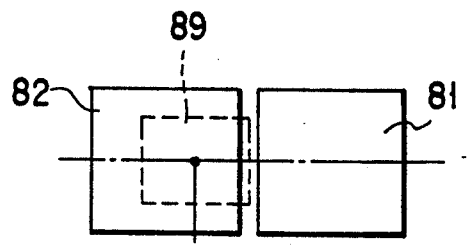
FIGS. 13A, 13B, 13C, and 13D are explanatory diagrams showing how the reflected-light image from the object is formed on a set of light-receiving elements depending on the distance from device to object.
Figure 13B:
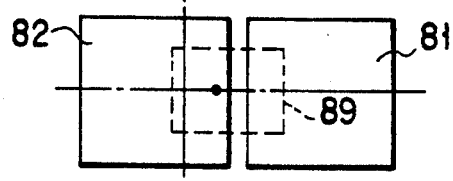
Figure 13C:
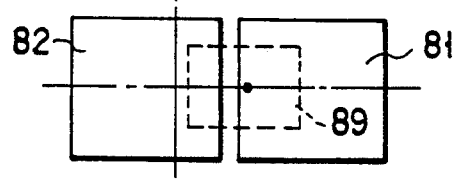
Figure 13D:
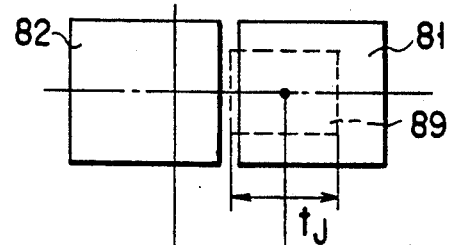
Figure 13E:
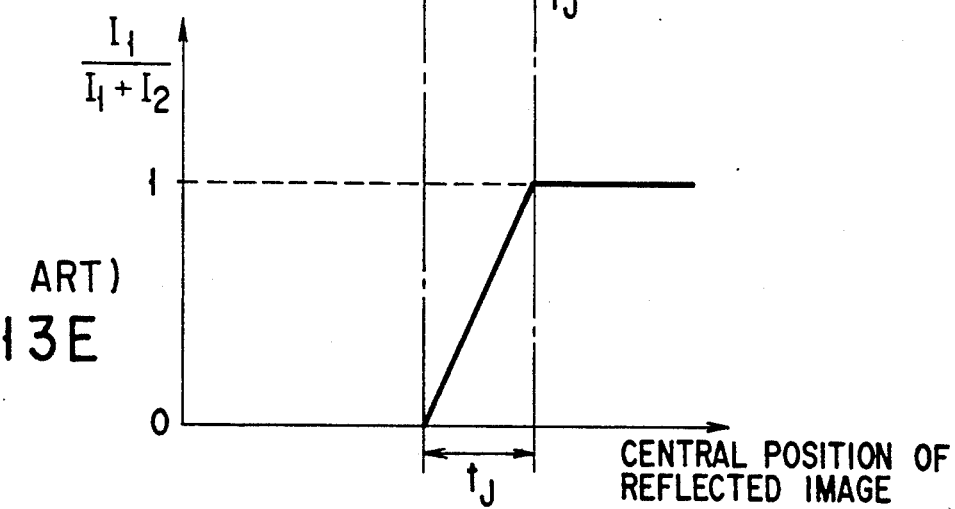
FIG. 13E is a characteristic diagram of the calculation output $I_1/(I_1+I_2)$ when the center of the reflected-light image is in the position corresponding to FIG. 13A, 13B, 13C, or 13D.
Figure 14A:
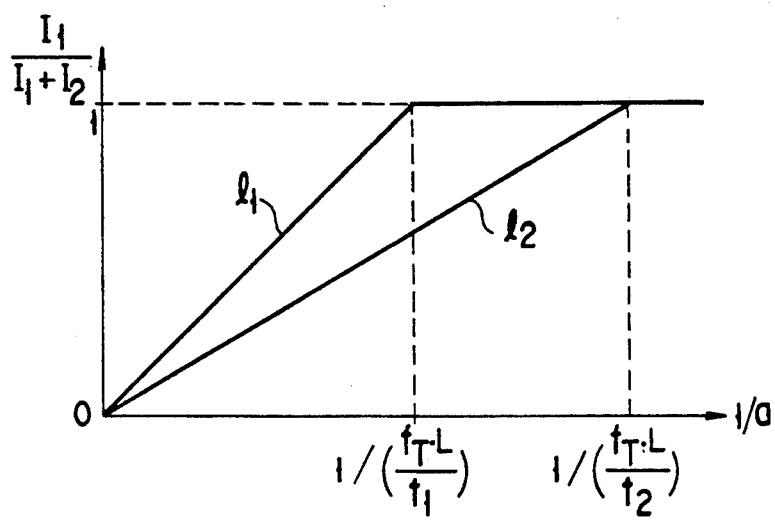
FIGS. 14A and 14B are characteristic diagrams each showing the relationship between the reciprocal of the distance from device to subject and the calculation output $I_1/(I_1+I_2)$ in the conventional distance-measuring device, and the distance calculation output to which the noise component is added.
Figure 14B:
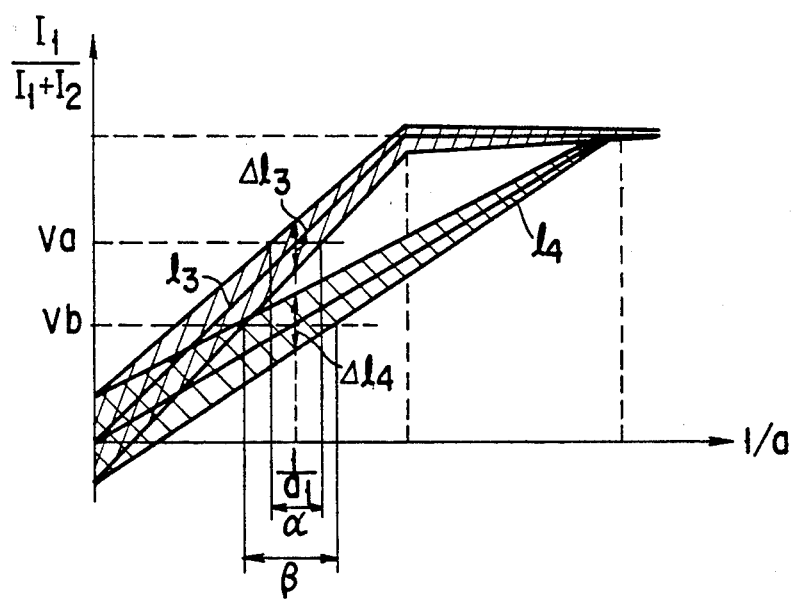
Figure 15A:
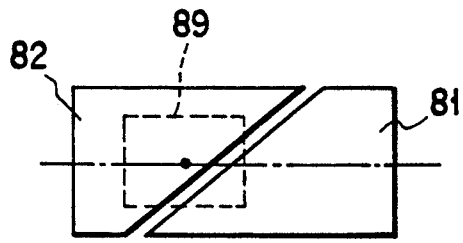
FIGS. 15A through 15E are explanatory diagrams for a conventional element in which the boundary line is tilted to the direction of the base length.
Figure 15B:
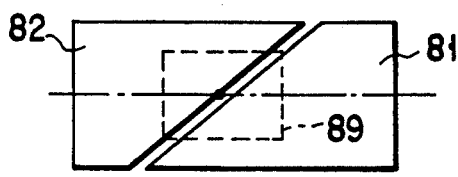
Figure 15C:
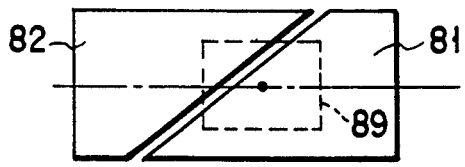
Figure 15D:
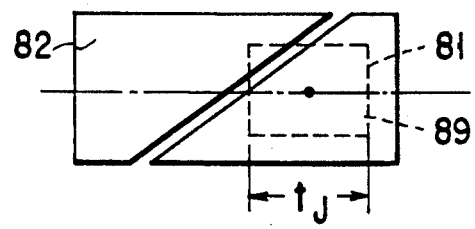
Figure 15E:
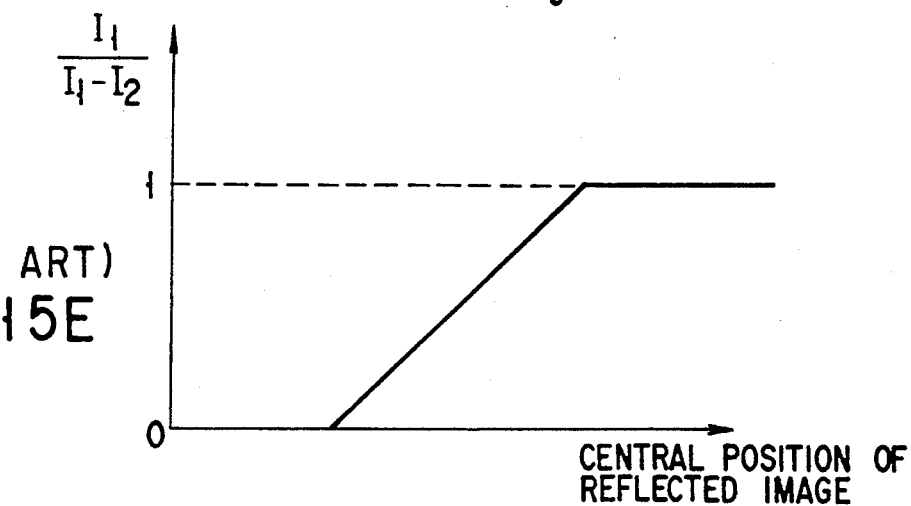

The output currents $I_1'$ and $I_2'$ of the first and second calculation output circuit sections 23 and 23A deal with the respective measuring ranges covering an infinitely long distance to the shortest distance, according to the reciprocal of the distance a from device to subject as shown in FIGS. 8A and 8B. A total distance-measuring characteristic diagram shown in FIG. 8C is obtained by combining these two diagrams.

Nonlinear correction of distance-measuring output with respect to 1/a may be made by writing correction values into an $E^2$-PROM and performing corrective calculation based on the stored values. Since the corrective method is based on well-known gradient correction and shift correction, its detailed explanation will be omitted.

As noted above, the distance from device to subject can be determined based on the composite sum of two calculation outputs.

The count circuit section 24 of FIG. 5 obtains the sum of the collector currents $I_1'$ and $I_2'$ of the transistors 45 and 45A in the calculation output circuit sections 23 and 23A and measures it digitally with a counter mechanism (not shown) built in the control circuit section 25.

The output current sum $I_1' + I_2'$ of the calculation output circuit sections 23 and 23A is calculated in a manner described below. The constant current sources 43 and 43A go active in synchronization with light projection. Each time light is projected, the output currents from the calculation output circuit sections 23 and 23A flow into the capacitor 52 to accumulate charges in it. The operational amplifier 53 is used to reset the capacitor 52. The base of the transistor 54 to control the amplifier 53 is connected to the terminal $T_3$ of the control circuit section 25 via the resistor 76. The output signal from the terminal $T_3$ (see FIG. 6) causes the transistor 54 to turn on, which sets the potential of the capacitor 52 to the reference potential $V_{ref}$. The transistor 54 is turned off immediately before the start of light projection, causing the operational amplifier 53 to be inactive. After this, the potential of the capacitor 52 increases as current is injected into the capacitor 52.

After a specified number of light projections are finished, as seen from the timing chart in FIG. 6, the terminal $T_4$ changes from the high to low level, which turns off the transistor 63, allowing the capacitor 52 to discharge via the transistor 55. At the same time, the counter in the control circuit section 25 starts and continues counting until the output of the comparator 62 goes high. The comparator 62, when the voltage across the two terminals of the capacitor 52 drops below the reference voltage $V_{ref}$, changes from the low to high level. The discharging speed of the capacitor 52 is determined by the constant current source 61 and the current mirror circuit including the transistors 56 and 55 connected in series with the source. In this way, the output in proportion to the distance from device to subject can be obtained in the form of counts of the counter in the control circuit 25.

FIG. 10 shows another embodiment of the calculation circuit section 23. With this embodiment, the distance from device to subject can be determined based on the ratio of the difference between the amount of light $I_{1b}$ and $I_{2b}$ in the two light-receiving areas to the total amount of light received, $(I_{1b} - I_{2b})/(I_{1b} + I_{2b})$.

A detailed explanation of the FIG. 10 circuit and calculation method is disclosed in Published Unexamined Japanese Patent Application No. 1-150809, issued to the applicant of the present invention.

Figure 2B:
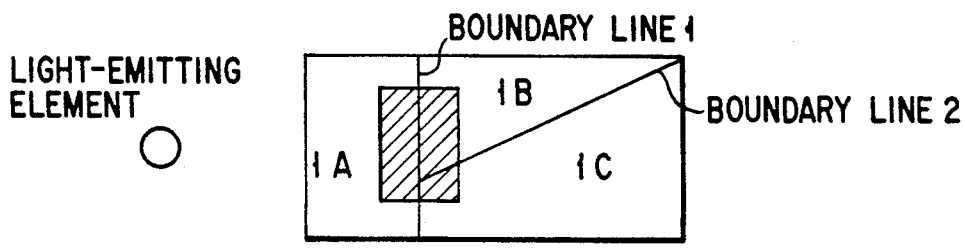
Figure 2C:
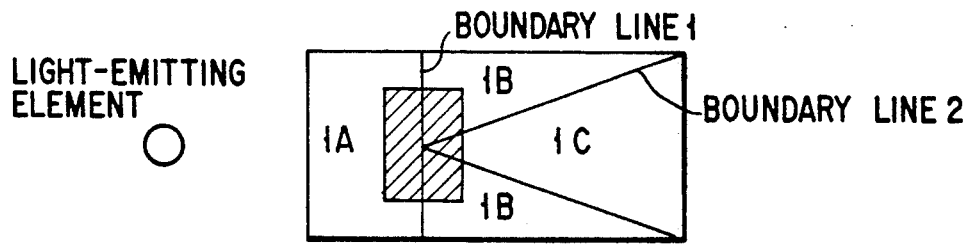
Figure 2D:
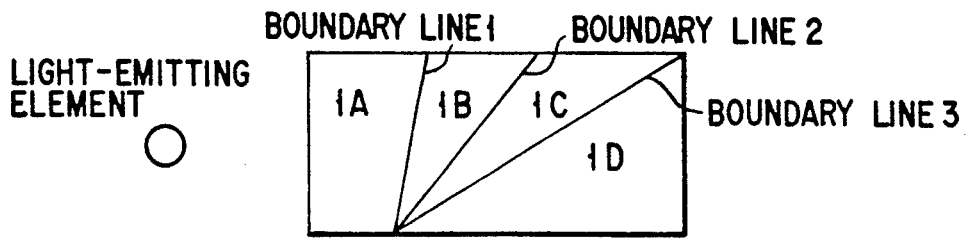

FIGS. 2B through 2D illustrate the shapes of other light-receiving elements and their boundary lines. In FIG. 2B, the boundary line 1 divides the element into SPD 1A and a set of SPD 1B and 1C, and the boundary line 2 splits the element into SPD 1C and a set of SPD 1A and 1B. In FIG. 2C, the boundary line 1 segments the element into SPD 1A and a set of SPD 1B and 1C, and the boundary line 2 splits the element into SPD 1C and a set of SPD 1A and 1B. In FIG. 2D, the boundary line 1 divides the element into SPD 1A and a set of SPD 1B, 1C, and 1D, and the boundary line 2 splits the element into a set of SPD 1A and 1B and a set of SPD 1C and 1D, and the boundary line 3 segments the element into SPD 1D and a set of SPD 1A, 1B, and 1C.

Instead of synthesizing two characteristics as noted above, each characteristic may be obtained in a time-series manner and used separately. FIG. 7 is a timing chart used to obtain in a time-series manner the characteristic diagrams shown in FIGS. 8A and 8B under the control of the output signals $T_6$ and $T_7$ from the terminals of the control circuit section 25. This method is possible as long as the measuring time has no effect on the camera time lag. While the characteristics in FIGS.

8A and 8B are obtained in a time-series manner, a distance-measuring action for $I_1'$ (or $I_2'$) may be omitted, if necessary, when it is found that the subject is in the short-distance range (or the long-distance range) at the time of determining $I_2'$ (or $I_1'$).

As described above, in the present invention, there are boundary lines each of which divides a plurality of light-receiving elements into two light-receiving areas. More than two distance calculation outputs from the two light-receiving areas facing each other across each boundary line, which crosses the direction of the base length at a different angle, cover different distance-measuring ranges. This approach makes it possible to provide a distance-measuring device capable of measuring a long distance very accurately with a wide distance-measuring range.

With this configuration, it is possible to make the construction simple and compact enough for use with small devices such as cameras without increasing light energy of the light-emitting elements by using large-size power supply batteries. The built-in distance-measuring device not only improves the distance-measuring accuracy of the camera, but also expands its distance-measuring range. Particularly, when an object as small as a person is at a relatively long distance and the light-projecting image is cast partially on the object, the distance-measuring accuracy can deteriorate seriously. With the present invention, however, it is unnecessary to increase the light-projecting image size, thereby preventing the distance-measuring accuracy from getting worse. As a result, the distance-measuring accuracy always remains at a sufficiently acceptable level.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A distance-measuring device comprising:
   light-projecting means for projecting luminous flux to a subject;
   light-receiving means located a base length away from said light-projecting means for receiving reflected rays of light from said subject and generating a photoelectric current in proportion to the amount of light received, said light-receiving means being divided into at least four light-receiving sections by a first dividing line that crosses said base length at right angles and by a second dividing line that crosses said first dividing line;
   first ratio calculating means for calculating a ratio of a sum of the photoelectric currents generated by light-receiving sections on one side of said first dividing line to a sum of the photoelectric currents generated by light-receiving sections on the other side of said first dividing line;
   second ratio calculating means for calculating a ratio of a sum of the photoelectric currents generated by light-receiving sections on one side of said second dividing line to a sum of the photoelectric currents generated by light-receiving sections on the other side of said second dividing line; and
   distance-determining means for calculating the sum of an output of said first ratio calculating means and an output of said second ratio calculating means and, based on the resulting value, determining a distance from the device to the subject.

2. A distance-measuring device according to claim 1, wherein:
   said first and second ratio calculating means produce currents in proportion to the resulting value of the sum of their respective outputs, and
   said distance-determining means integrates said currents depending on a number of light projections by said light-projecting means, performs analog-to-digital conversion of the integrated value of said currents upon completion of a final light projection, and based on the resulting value, determines the distance from the device to the subject.

3. A distance-measuring device comprising:
   light-projecting means for projecting luminous flux to an object;
   light-receiving means located a base length away from said light-projecting means for receiving reflected rays of light from said subject, said light-receiving means being divided into a plurality of light-receiving sections by a first dividing line and a second dividing line that crosses said first dividing line;
   first calculating means for calculating a ratio of outputs from light-receiving sections on opposite sides of said first dividing line to produce a first ratio output;
   second calculating means for calculating a ratio of outputs from light-receiving sections on opposite sides of said second dividing line to produce a second ratio output; and
   distance-determining means for selectively determining a distance from the device to the object based on a selected one of the following:
      the first ratio output of said first calculating means when measuring a short distance;
      the second ratio output of said second calculating means when measuring a long distance; and
      both the first and second ratios.

4. A distance-measuring device according to claim 3, wherein said distance-determining means determines the distance on the basis of a sum of the outputs of said first and second calculating means.

5. A distance-measuring device according to claim 3, wherein said distance-determining means determines the distance based on the output of said second calculating means only after said distance-determining means determines it finds that said subject is at a long distance, based on the output of said first calculating means.

6. A distance-measuring device comprising light-projecting means for projecting luminous flux to an object, light-receiving means for receiving reflected rays of light from said object and producing an output in proportion to the amount of light received, and distance-calculating means for calculating a distance from the device to said object based on the output of said light-receiving means, wherein:
   said light-receiving means is divided into at least three light-receiving sections by a plurality of dividing lines, and includes at least three signal output portions for outputting signals generated by said light-receiving sections; and
   said distance-calculating means includes means for calculating a ratio of the sum of output signals from a plurality of light-receiving sections located on one side of each of said dividing lines to an output signal from a light-receiving section located on the other side of each of said dividing lines, and means for determining the distance from the device to the object on the basis of a ratio calculated for each dividing line.

7. A distance-measuring device according to claim 6, wherein said light-receiving means is divided into four light-receiving sections by a first dividing line that meets with the base length at a right angle, the base length being formed by said light-projecting means and light-receiving means, and by a second dividing line that crosses said first dividing line.

8. A distance-measuring device according to claim 6, wherein said light-receiving means is divided by a first dividing line that meets with the base length at a right angle, the base length being formed by said light-projecting means and light-receiving means, and one area defined by said first dividing line being subdivided by a second dividing line.

9. A distance-measuring device according to claim 6, wherein said light-receiving means is divided by a first dividing line that meets with the base length at a right angle, the base length being formed by said light-projecting means and light-receiving means, and one area defined by said first dividing line being subdivided by a plurality of dividing lines.

10. A distance-measuring device comprising:
light-projecting means for projecting distance-measuring light onto an object;
light-receiving means located a base length away from said light-projecting means for receiving reflected rays of light from the object with a light-receiving element that is divided by a first boundary line crossing the direction of the base length almost at a right angle and by a second boundary line crossing the direction of the base length obliquely;
first calculating means for respectively adding outputs of light-receiving elements located on each side of said first boundary line and calculating a ratio of the two added values to
second calculating means for respectively adding outputs of light-receiving elements located on each side of said second boundary line and calculating a ratio of the two added values to produce a second ratio output; and
third calculating means for selectively determining a distance from the device to the object based on a selected one of the following:
the first ratio output of said first calculating means when measuring a short distance; and
the second ratio output of said second calculating means when measuring a long distance.

11. A distance-measuring device according to claim 10, wherein said third calculating means determines the distance from the device to the object based on the output of said first calculating means when the distance obtained based on the output of said second calculating means is larger than a specified value.

12. A distance-measuring device according to claim 10, wherein said third calculating means determines the distance from the device to the object based on the output of said second calculating means when the distance obtained based on the output of said first calculating means is larger than a specified value.

13. A distance-measuring device comprising:
light-projecting means for projecting distance-measuring light onto an object;
light-receiving means located a base length away from said light-projecting means for receiving reflected rays of light from the object with a light-receiving element that is divided by first and second boundary lines each crossing the direction of the base length at a different angle;
first calculating means for respectively adding outputs of light-receiving elements located on each side of said first boundary line and calculating a ratio of the two added values to produce a first ratio output;
second calculating means for respectively adding
second calculating means for respectively adding outputs of light-receiving elements located on each side of said second boundary line and calculating a ratio of the two added values to produce a second ratio output; and
third calculating means for selectively determining a distance from the device to the object based on a selected one of the following:
the first ratio output of said first calculating means when measuring a short distance;
the second ratio output of said second calculating means when measuring a long distance; and
both the first and second ratios.

14. A distance-measuring device according to claim 13, wherein said third calculating means calculates the sum of the outputs of said first and second calculating means, and based on the resulting value, determines the distance from the device to the object.

15. A distance-measuring device according to claim 13, wherein said third calculating means determines the distance from the device to the object based on the output of said first calculating means when the distance obtained based on the output of said second calculating means is larger than a specified value.

16. A distance-measuring device according to claim 13, wherein said third calculating means determines the distance from the device to the object based on the output of said second calculating means when the distance obtained based on the output of said first calculating means is larger than a specified value.

17. A distance-measuring device comprising:
light-projecting means for projecting distance-measuring light onto an object;
light-receiving means located a base length away from said light-projecting means for receiving reflected rays of light from the object with light-receiving elements divided by more than two boundary lines; and
calculating means for combining and adding outputs of the light-receiving elements divided by the boundary lines, and determining a distance from the device to the object based on an output ratio of respective added outputs of light-receiving elements on opposite sides of each boundary lines, wherein said calculating means calculates the output ratio of combining and adding the outputs of the individual light-receiving elements so that a change rate of the output ratio with respect to the distance from the device to the object is larger in the long-distance range than in the short-distance range.

18. A distance-measuring device according to claim 17, wherein said boundary lines each cross the direction of the base length at different angles, at least one of which meets with the direction of the base length at a right angle.

19. A distance-measuring device comprising:

light-projecting means for projecting distance-measuring light onto an object;

light-receiving means located at base length away from said light-projecting means, for receiving reflected rays of light from the object with light-receiving elements divided by more than two boundary lines, each boundary lines being at a different angle with respect to the direction of the base length; and calculating means including ratio output means for outputting the ratio of the sum of outputs from at least one of a plurality of light-receiving elements located on one side of each of said boundary lines to the sum of outputs from at least one of a plurality of light-receiving elements located on the other side of each of said boundary lines, for each boundary line.

20. A distance-measuring device according to claim 19, wherein said light-receiving means includes at least one boundary line that meets with the direction of the base length at a right angle.

21. A distance-measuring device according to claim 19, wherein said calculating means calculates the output ratio by combining and adding the outputs of the individual light-receiving elements so that a change rate of the output ratio with respect to the distance from the device to the object is larger in the long-distance range than in the short-distance range.

22. A distance-measuring device comprising:

light-projecting means for projecting distance-measuring light onto an object;

light-receiving means, including a plurality of light-receiving elements and located a base length away from said light-projecting means, for receiving reflected rays of light from the object and producing photoelectric conversion signals, said plurality of light-receiving elements being divided by boundary lines that extend so as to cross the base length;

photoelectric current sensing means for sensing a photoelectric current for each light-receiving element;

calculating means for calculating a ratio of photoelectric conversion signals corresponding to reflected rays of light incident on first and second light-receiving element groups, said first group being formed by a plurality of light-receiving elements located on one side of each of said boundary lines, and said second group being formed by a plurality of light-receiving elements located on the other side of each of said boundary lines; and distance-determining means for determining a distance from the device to the object based on a sum of outputs of said calculating means which correspond to said boundary lines.

23. A distance-measuring device comprising:

light-projecting means for projecting distance-measuring light onto an object;

light-receiving means located a base length away from said light-projecting means, for receiving reflected rays of light from the object and producing a photoelectric conversion signal, said light-receiving means including a plurality of light-receiving elements;

photoelectric current sensing means, including a plurality of output terminals for outputting currents corresponding to the amount of light incident on said light-receiving elements, said output terminals being provided at least two for each light-receiving element;

light-receiving element group forming means for generating current outputs corresponding to outputs from a plurality of light-receiving element groups by utilizing combinations of said output terminals;

a plurality of calculating means, each for calculating a ratio of outputs from two light-receiving elements groups; and distance-determining means for determining the distance from the device to the object based on ratios output from said calculating means.

24. A distance-measuring device according to claim 23, wherein said photoelectric current sensing means includes a current mirror circuit which produces a plurality of photoelectric currents corresponding to the reflected rays of light received by said light-receiving elements.

* * * * *